(12) United States Patent
Chikovani et al.

(10) Patent No.: US 7,281,426 B1
(45) Date of Patent: Oct. 16, 2007

(54) STEMLESS HEMISPHERICAL RESONATOR GYROSCOPE

(75) Inventors: Valery V. Chikovani, Kiev (UA); Yury A. Yatzenko, Kiev (UA); Vladimir A. Kovalenko, Kiev (UA); Vladimir I. Scherban, Kiev (UA)

(73) Assignee: Innalabs Technologies, Inc., Dulles, VA (US)

( * ) Notice: Subject to any disclaimer, the term of this patent is extended or adjusted under 35 U.S.C. 154(b) by 0 days.

(21) Appl. No.: 11/424,323

(22) Filed: Jun. 15, 2006

(51) Int. Cl.
*G01P 9/04* (2006.01)
(52) U.S. Cl. .................................. 73/504.13
(58) Field of Classification Search ............ 73/504.02, 73/504.04, 504.12, 504.13, 504.14, 504.15, 73/504.16
See application file for complete search history.

(56) References Cited

U.S. PATENT DOCUMENTS

| | | | | |
|---|---|---|---|---|
| 4,644,793 | A * | 2/1987 | Church | 73/504.13 |
| 6,016,699 | A | 1/2000 | Kasanami et al. | |
| 6,272,925 | B1 * | 8/2001 | Watson | 73/504.12 |
| 6,343,509 | B1 * | 2/2002 | Fell et al. | 73/504.13 |
| 7,188,524 | B2 * | 3/2007 | Nishida et al. | 73/504.13 |

OTHER PUBLICATIONS

Yatsenko, Y.A., et al., "High-Q Quartz Resonator Using Piezo-Electric Excitation and Control of the Third Oscillation Mode," 9th St. Petersburg International Conference on Integrated Navigational Systems, pp. 359-360 (May 2002).

Yatsenko, Y.A., et al., "Development of Stemless Quartz Hemispherical Resonator for Vibratory Gyroscope," Symposium Gyro Technology, pp. 7.1-7.10 (2002).
Yatsenko, Y., et al., "The principle of angular rate sensors building on the basis of solid-state wave gyro using cylindrical resonator and poaition excitation." Central Design Bureau "Arsenal" (1996).
Chikovani, V.V., et al., "Test Results for the First Batch of Coriolis Vibratory Gyroscopes and Analysis of Their Characteristics," Gyroscopy and Navigation 2:41 (2003).

* cited by examiner

*Primary Examiner*—Helen Kwok
(74) *Attorney, Agent, or Firm*—Bardmesser Law Group

(57) ABSTRACT

A vibrational gyroscope includes a piezoelectric ring having a central opening, and a hemispherical resonator having a central opening and mounted over the opening of the central opening of the piezoelectric ring. A plurality of electrodes delivers a voltage to the piezoelectric ring. A plurality of electrodes provides signal readout that corresponds to angular velocity. The hemispherical resonator can be glued to the piezoelectric ring. The hemispherical resonator preferably vibrates in the third vibration mode. A plurality of capacitive electrodes can be located at nodes and at antinodes of the vibration of the hemispherical resonator, and provide a signal readout that corresponds to the angular velocity. The piezoelectric ring is segmented, non-segmented, or includes an outer segmented portion and an inner non-segmented portion. The inner non-segmented portion can be used to excite the resonator into a vibration mode, and the outer segmented portion provides a readout signal and is used to adjust the vibration of the resonator. The piezoelectric ring includes a conductive coating used to conduct excitation voltage to the piezoelectric ring.

19 Claims, 9 Drawing Sheets

STEMLESS HEMISPHERICAL RESONATOR GYROSCOPE

BACKGROUND OF THE INVENTION

1. Field of the Invention

The present invention relates to vibrational gyroscopes, and more particularly, to high performance stemless hemispherical resonator gyroscopes.

2. Background Art

Generally, the present invention is related to coriolis vibration gyroscopes (CVGs) that typically use resonators made of quartz. Such gyroscopes are described, for example, in U.S. Pat. Nos. 4,951,508, 4,157,041, 3,719,074, 3,656,354, 6,357,296 and 5,383,362.

Numerous geometries of vibrational structures are known, and these various geometries are commonly used in vibrational gyroscopes. For example, such structures include disks, rods, cylinders, hemispheres, etc. The vibrating elements can be made out of different materials, such as ceramics, glass, quartz, metal, although the use of quartz or fused silica is most common. Usually, the best performance is provided by gyroscopes whose resonators have a high degree of axial symmetry, and the resonator is made of a high-Q material. Since fused silica possesses such characteristics as high degree of stability of elastic characteristics, and since a hemisphere has the highest degree of axial symmetry of all the possible resonator geometries that are commonly used, gyroscopes that use hemispherical quartz resonators tend to have the highest precision. The Q factor of many such resonators can reach several million, while metal resonators rarely have a Q factor higher than a few tens of thousands.

A CVG can also function as an angular velocity sensor that detects rotation in two possible modes of operation—an open-loop mode, and a closed-loop mode. The closed-loop mode is also sometimes referred to as a force-rebalance mode. The CVG can also function as an integrating gyroscope, also known as a "whole-angle mode," which measures the angle of rotation of the gyroscope. See D. D. Lynch "Standard Specification Format Guide and Test Procedure for Coriolis Vibratory Gyros," September 1998 meeting of the IEEE GAP in Stuttgart, Sep. 18-19, 1998.

In the simplest mode of operation, the open-loop mode, a standing wave is excited in the resonator in one of its modes of vibration (the drive mode). Usually, the second vibration mode is used, with an amplitude that is maintained constant by an automatic gain control system (AGC). At the same time, a standing wave is produced within the resonator, which, in the second vibration mode of the resonator, has four nodes and four anti-nodes. When the entire vibrating structure rotates about its axis, a coriolis force results, given by the equation $F_c=2[\Omega \times V]$, where $F_c$ is the coriolis force, $\Omega$ is the angular velocity of the resonator about its axis symmetry, and V is the linear velocity (in the radial direction, to and from the cylinder center axis). The coriolis force $F_c$ generates vibrations in the sense mode, which are measured, and whose amplitude is proportional to the angular velocity $\Omega$. The spatial orientation of the two modes is 45 degrees relative to each other, for the second vibration mode.

When the CVG works in the open-loop mode, its bandwidth is directly related to the Q factor of the coriolis vibration mode, in other words, to the damping time constant of the coriolis vibration mode. When the Q factor is relatively high, for example, Q=10000, the bandwidth of the resonator is on the order of $\Delta f=(\pi f_c)/Q \approx 1.5$ Hz if the frequency of excitation of the resonator $f_c$=5000 Hz. Such a gyroscope can, in practice, only measure relatively constant angular velocities. Such measurements are usually done, for example, using gyrotheodolite (a gyro-optical instrument used to measure the azimuth fixed by a theodolite direction) when measuring the azimuth of a given direction.

To increase the bandwidth of the gyroscope, it is necessary to ensure that the coriolis mode of vibration damps down relatively quickly, which in turn leads to a lower Q factor of the measured vibration mode, and, consequently, to an increase in the gyroscope's bandwidth. The damping down of the measured vibration mode is done in the closed-loop mode, in other words, in the force rebalance mode. In this mode, the nodal point signal is measured, which is the same thing as the sense mode signal, and a negative feedback signal is generated, which compensates for the signal arising in the nodes by supplying an anti-phase signal to one of the free nodes or to two diametrically opposite nodes out of the four nodes. Therefore, the measured mode of vibration is also suppressed, leading to a relatively low Q factor. With a Q factor of 100, the bandwidth would be approximately $\Delta f$=150 Hz. A CVG with such a bandwidth can be used in many inertial systems that are mounted on moving objects.

In the whole-angle mode, the Coriolis force $F_c$ that results from the rotation of the resonator converts the energy of the vibration from the sense mode into the excitation mode and back, where the superposition of these two modes can be measured. Also, in this case, the standing wave in the resonator rotates together with the resonator. The angle of rotation of the standing wave lags behind the angle of rotation of the gyroscope by a constant factor, which is defined only by the working vibration mode. For the second mode of vibration, the constant factor is approximately 0.32, for the third mode of vibration, the constant factor is approximately 0.25.

The design of the gyroscope that uses a hemispherical resonator, as described above, suffers from a number of problems. One of these problems is the difficulty in mass-producing a relatively complex-shaped part—the meniscus-shaped resonator with a stem, which is used for mounting. Such a shape is relatively difficult to produce in mass quantities. Another problem is that due to the complex shape, maintaining perfect axial symmetry of the resonator is extremely difficult. Typically, during manufacture, the body of the resonator (the hemispherical portion) has thickness mismatches, which require extensive rebalancing and/or micro-machining to eliminate. This raises the cost of the resonator considerably, and increases the manufacturing time.

Another difficulty with such conventional gyroscopes is the need to use capacitors for generating and detecting the vibration modes of the resonator. These capacitors typically require a relatively high voltage, on the order of several hundred volts, at times as much as 600 volts. Such high voltages are very inconvenient to work with, particularly where the overall device itself needs to be small. Also, the use of such high voltages tends to result in a shorter life span of the device, and a faster wear on the electrical components of the device. Note that the disadvantages described above apply to both the open-loop and the closed-loop gyroscopes. Another problem is that due to the high voltages involved, the power consumption of the device tends to be substantial.

Accordingly, there is a need in the art for a high precision vibration gyroscope that addresses some or all of these problems.

BRIEF SUMMARY OF THE INVENTION

The present invention relates to an improved high precision stemless hemispherical resonator gyroscope that substantially obviates one or more of the disadvantages of the related art.

More particularly, in an exemplary embodiment of the present invention, a gyroscope includes a piezoelectric ring having a central opening, and a hemispherical resonator having a central opening and mounted over the opening of the central opening of the piezoelectric ring. A plurality of electrodes deliver a voltage to the piezoelectric ring. Another plurality of electrodes provide signal readout that corresponds to angular velocity. The hemispherical resonator can be glued to the piezoelectric ring.

In an exemplary embodiment, the hemispherical resonator vibrates in the third vibration mode. A plurality of capacitive electrodes are located at nodes and at antinodes of the vibration of the hemispherical resonator, and provide a signal readout that corresponds to the angular velocity. The piezoelectric ring can be segmented, non-segmented, or can include an outer segmented portion and an inner non-segmented portion. The inner non-segmented portion can be used to excite the resonator into a vibration mode, and the outer segmented portion provides a readout signal and is used to adjust the vibration of the resonator. The piezoelectric ring can include a conductive coating used to conduct excitation voltage to the piezoelectric ring.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
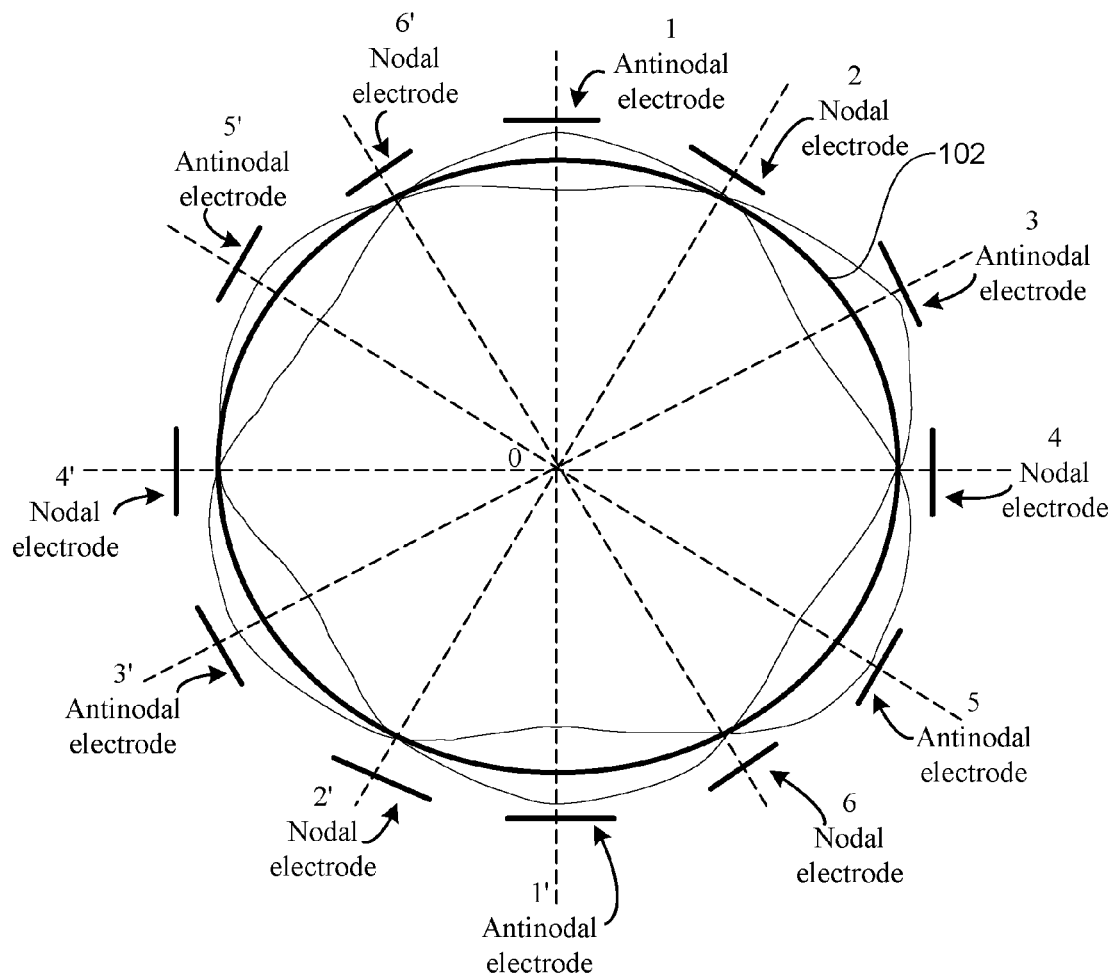
FIG. 1 illustrates the third vibration mode of a hemispherical resonator and the locations of the electrodes at the vibrational nodes.

Reference will now be made in detail to embodiments of the present invention, examples of which are illustrated in the accompanying drawings.

One embodiment of the present invention is a vibrational gyroscope with a hemispherical resonator that is stemless. The hemisphere is mounted on a piezoelectric ring, for example, using glue or epoxy. The ring itself can be manufactured from any material that has piezoelectric properties. The pole of the hemisphere is positioned directly over the opening of the piezoelectric ring. At the same time, the piezoelectric ring can be unitary, or can be segmented using a segmented coating (for example, silver), depending on which vibration mode is chosen, for example, second, third, etc. In the case of a segmented ring, each segment of the ring receives a voltage to excite the resonator and/or (in the case of closed-loop operation) to control the standing wave, and, also possibly to read out the signal that relates to the angular velocity. In the case of a non-segment ring, a single voltage is supplied, providing an analog of the parametric excitation. To increase accuracy and sensitivity of the signal readout system, conventional capacitive sensors can be located near the equator of the hemisphere.

Manufacturing of a stemless hemisphere greatly improves the smoothness of the surface of the resonator, easily by a factor of 3-5. Furthermore, there is no need for a complex process of static and dynamic balancing of the resonator, which is necessary if the hemisphere deviates substantially from perfect axial symmetry. Furthermore, well-known manufacturing techniques used in lense manufacture can be used as well, simplifying the process and reducing manufacturing cost.

In order to initiate and sustain excitation of a quartz resonator by using a piezoelectric ring, a voltage on the order of about 1 volt is needed. Since the resistance of a piezoelectric ring is very high, typically on the order of tens of megaohms, the power consumption required to keep the resonator in an excited state (i.e., vibrating) is a small fraction of a milliwatt, on the order of $1/100^{th}$ of a milliwatt.

When dissimilar elements, in this case, the piezoelectric ring and a quartz resonator, are joined, there is an interaction between the vibrating elements, caused by non-conservative forces generated when the resonator vibrates in the second vibration mode. This leads to an energy dissipation of the excitation, in other words, to a reduction in the Q factor of the resonator, and, consequently, to a loss of accuracy of the gyroscope. When the third excitation mode is used, this interaction is of a conservative nature, and does not lead to a significant energy loss or to a reduction in the Q factor. Therefore, there is no loss of accuracy of the gyroscope's measurements. Thus, the Q factor of a resonator described herein used in the second vibration mode is on the order of $10^5$, while using the third vibration mode, the Q factor is approximately $3 \times 10^6$. Therefore, the third vibration mode has significant advantages over the second vibration mode for the proposed device. Furthermore, in the third vibration mode, the imperfections in the resonator due to manufacturing tolerances and such (in other words, such imperfections as ellipticity and thickness variation of the hemisphere) matter significantly less, and these have a smaller effect on the zero bias drift of the gyroscope.

Since the third vibration mode of the stemless hemisphere resonator has considerably higher Q factor, the discussion below will be primarily in terms of the third vibration mode, although one of ordinary skill in the art will readily appreciate how the discussion extends to other vibration modes as well. FIG. 1 illustrates the deformation of a resonator 102 when it vibrates in the third vibration mode. The standing wave has six antinodes that are oriented along the axes 1-1' 3-3' 5-5', and six nodes oriented along the axes 2-2', 4-4' and 6-6'.

The process of vibrational excitation of the hemispherical resonator 102 by using a piezoelectric ring (see 204 in FIG. 2) involves applying a voltage to the piezoelectric ring, such that a load that is evenly distributed along the ring is generated, where the load is created along the inner boundary of the ring. The load is given by the equation:

$$f_1 = \frac{d_{31} E_n h R_c}{r_0 + w(\theta)} U \quad (1)$$

Here, $d_{31}$—piezoelectric modulus of the piezoelectric ring, $E_n$—Young's modulus of the piezoelectric ring, $R_c$—average radius of the piezoelectric ring, h—average thickness of the piezoelectric ring, $r=r_0+w(\theta)$, $r_0$—inner radius of the piezoelectric ring, $w(\theta)$—amplitude of radial deformation, U—applied voltage.

A component of the force $f_1$ that is directed along the direction that is normal to the surface of the hemisphere 102 (see FIG. 2) can be represented as $$f_n = f_1 \frac{r}{R},$$

where R is the radius of the hemispherical meniscus. As a first approximation, for a small displacement w, the force can be written as:

$$f_w = -\frac{d_{31} E n n_c U}{R r_0} w(\theta) \quad (2)$$

Given that $$w(\theta) = w_0 \left(\theta = \frac{\pi}{2}\right)(n + \cos\theta) tg^n \frac{\theta}{2},$$

where θ is the angular coordinate of the hemisphere, and at the point of contact between the hemisphere 102 and the ring 204 can be expressed as $$w(\theta) = w_0(n+1)\left(\frac{r_0}{2R}\right)^n,$$

where n—the order of the vibration mode (in this case, n=3), $$w_0\left(\frac{\pi}{2}\right)$$

is therefore the amplitude of the deformation of the resonator 102 at its equator.

If the voltage applied to the piezoelectric ring 204 is an AC voltage, with a frequency close to the third vibration mode $U=U_0 \cos vt$, then the dynamic equation—(Equation (3)) of the hemispherical resonator will have the form:

$$\ddot{w}'' - \ddot{w} + 4\Omega \dot{w} + \kappa^2(w^{VI} + 2w^{IV} + w'') + \kappa^2 \xi(\dot{w}^{VI} + 2\dot{w}^{IV} + \dot{w}'') = w'' F_0 \sin vt \quad \text{Equation (3)}$$

where $$\kappa^2 = \frac{EI}{\rho S R^4},$$

here E—Young's modulus of the resonator's material, I—rotational moment of inertia relative to the axis of symmetry, S—cross-sectional area, ρ—density of the material of the resonator, ξ—energy loss coefficient, and $$F_0 = \frac{d_{31} E_n R_c h U_0}{R r_0 \rho S}(n+1)\left(\frac{r_0}{2R}\right)^n$$

is the applied force, and IV, VI refer to fourth and sixth derivative of the distance with regard to the circumferential coordinate.

Note that the force $F_0$ has a linear dependence on the applied voltage $U_0$. When the resonator 102 is not deformed, the distributed force (i.e., force caused by residual charges in piezo material) is balanced by the internal tension. When a force $F_0$ is applied to the resonator 102, the resonator 102 begins deforming. It should be noted that the resonator deformation has a specific form—each vibration mode has its own pattern of deformation. The third vibration mode has the highest Q factor, since it is energetically favorable. At the point where the resonator is maximally deformed, the applied force has a greater value than at the point where the resonator is minimally deformed. In this process, the rigidity of the attachment of the hemisphere 102 to the piezoelectric ring 204 is important, since it is the rigidity of the glue coupling that will determine the maximum permissible deformation amplitude $w_{max}(\theta)$. This is also due to the fact that the third vibration mode is the dominant mode in this case. Note that at the location where the hemisphere is mounted on the piezoelectric ring, the deformation amplitude of the second vibration mode is an order of magnitude greater than the deformation amplitude of the third vibration mode, and this determines the nature of the interaction between the hemisphere and the piezoelectric ring—whether it is conservative, or dissipative.

Considering the existence of the boundary conditions for the restricted amplitude oscillation described by Equation 3, it is possible to find the minimum value of the output voltage from the solution of Equation 3, which represents the angular velocity, and its dependence on the parameters of the sensing element, where exceeding that output voltage provides for a stable excitation of the resonator, from the condition $F_0 \geqq p$, where $p=18\xi I/5\rho SR^4$—decrement of the damping of the resonator, $U_{0min} \approx 18\xi I/5R^3 K_{\Theta m} a_n(\theta)$, where $K_{EM}=d_{31}E_n R_c h/r_0$—coefficient of electromechanical transformation of the piezoelectric ring, $a_n=(n+1)(r_0/2R)$.

Figure 4:
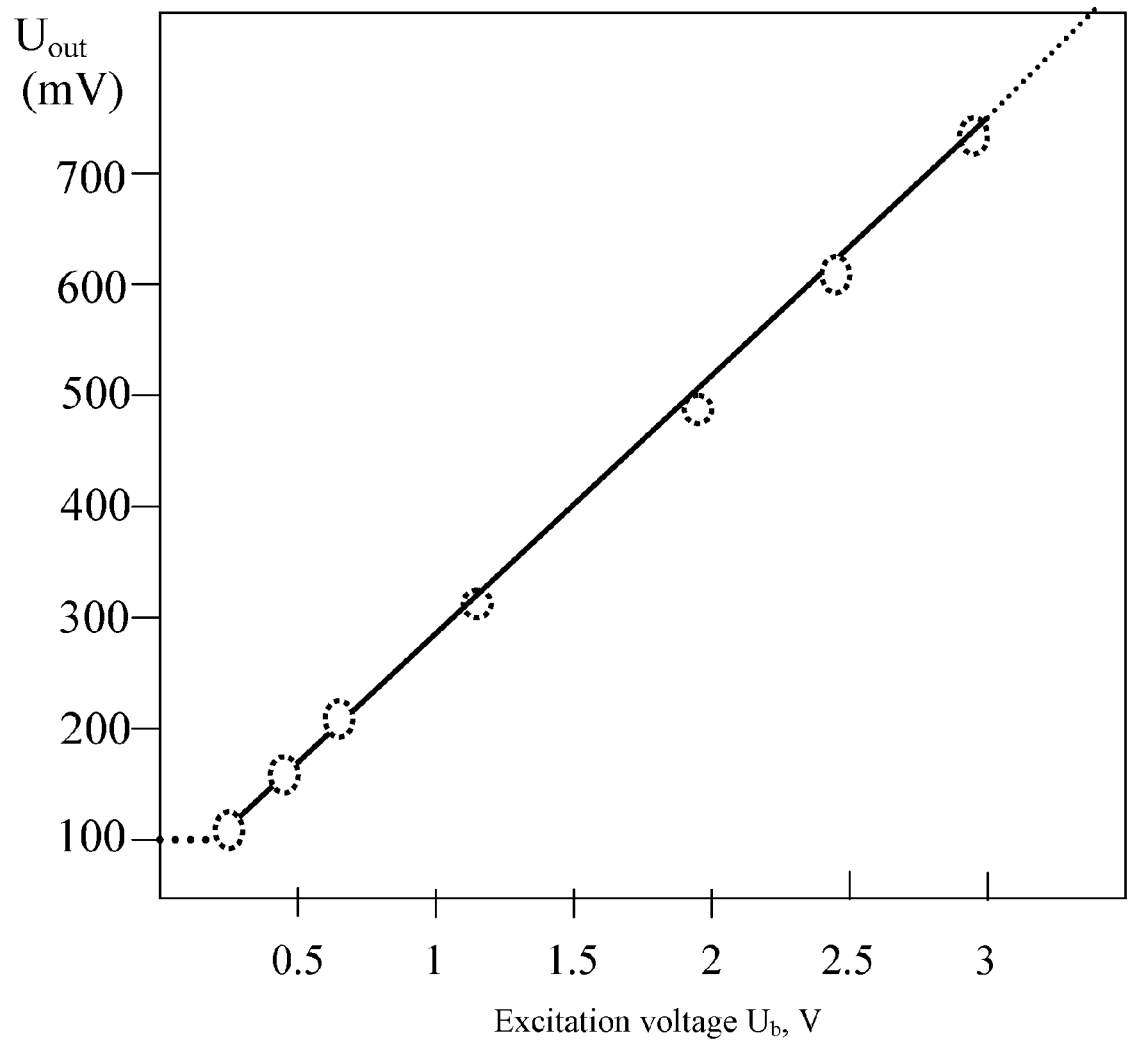
FIG. 4 illustrates the dependency of the amplitude of the vibration at the equator of the resonator on the amplitude of the voltage applied to the non-segmented ring.

Thus, the noise level of the excitation curve of the resonator, which can be seen in FIG. 4 (see dashed line) is defined by the losses in the resonator (4), the dimensional parameters of the resonator (the radius R, rotational moment of inertia I), and on the parameter $K_{EM}$ of the piezoelectric ring.

Figure 2:
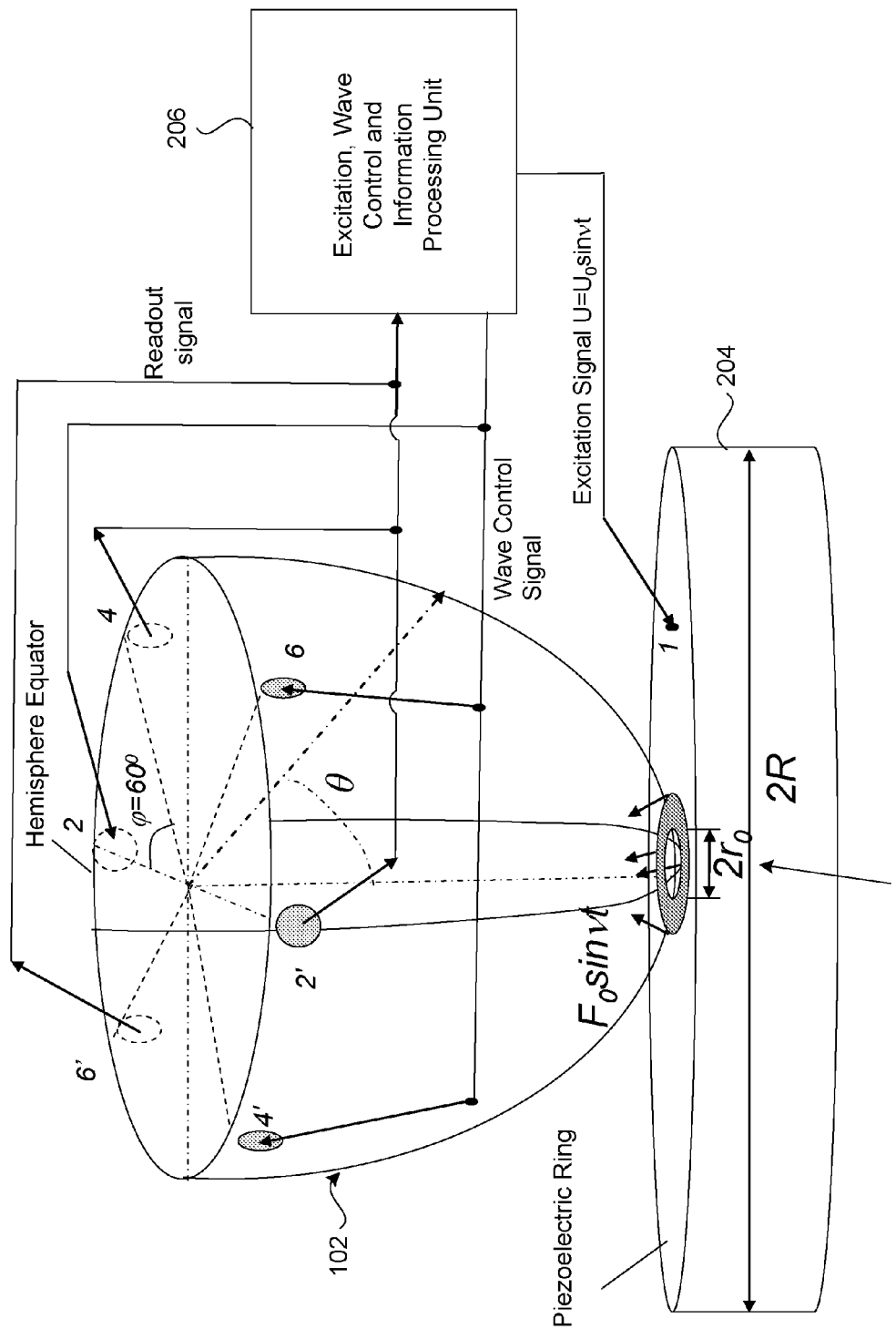
FIG. 2 is a schematic showing the excitation wave generation and the signal readout of the angular velocity for a non-segmented piezoelectric ring.

If a non-segmented piezoelectric ring is used, it is possible to excite the resonator and, in this case, control the standing wave, and the signal readout can be done using traditional capacitive methods, as shown in FIG. 2, and as described, for example, in U.S. Pat. Nos. 4,951,508, 4,157,041, 3,719,074 and 3,656,354. FIG. 2 illustrates a general view of the sensing element (in this case, a quartz hemispherical resonator, coupled to a piezoelectric ring), as well as a schematic of the control block 206 used for excitation, standing wave control and angular velocity signal readout. The hemispherical resonator 102 is mounted on the piezoelectric ring 204 close to the pole of the hemisphere, such that the small radius $r_0$ at the pole of the hemisphere is free, due to drilling a hole in the quartz hemisphere 102, with the radius $r_0$, which is equal to the radius of the opening 208 in the piezoelectric ring 204. If a non-segmented ring is used, the excitation is accomplished by supplying a voltage $U=U_0 \sin 2\pi ft$ to the piezoelectric ring 204, which deforms due to the voltage, thereby applying a force $F_0 \sin 2\pi ft$ to the resonator 102. This, in turn, causes the third mode of vibration, as discussed above. In this case, the control signals are supplied to the capacitive electrodes, such as 4', 6', 2', while the signal readout is received from electrodes 2, 6, 4. See also FIG. 5, which shows the connections from the electrodes to the control block 206, including the drivers/buffers 13, 14, 15, and 16, as would be well-understood by one of ordinary skill in the art.

Figure 3:
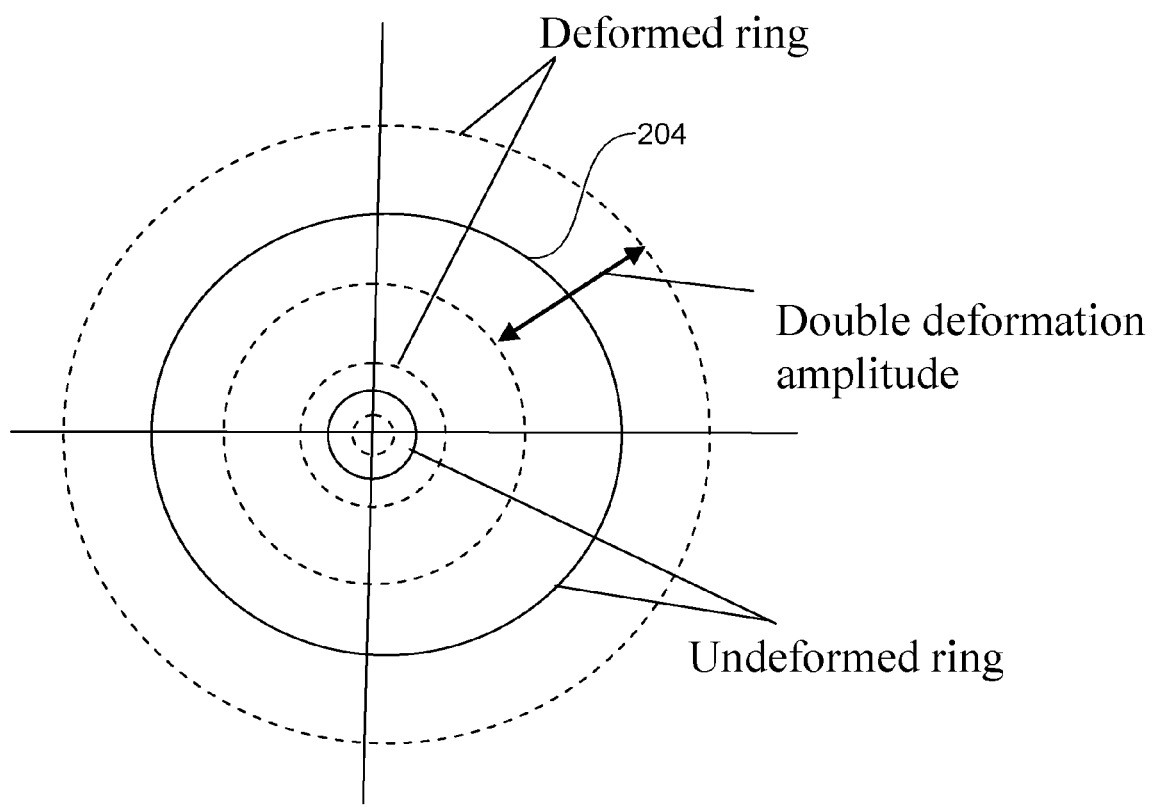
FIG. 3 illustrates the vibrational modes of the non-segmented piezoelectric ring when a periodic voltage is applied to it.

FIG. 3 illustrates the nature of the deformation when a non-segmented ring is used. The advantage of the proposed approach is, in part, in removing a source of energy loss of the resonator where the resonator has manufacturing imperfections. Specifically, there is energy dissipation through the pole of the hemispherical resonator, whose vibrational amplitude increases as the geometric mass imbalances increase. The energy is dissipated through the coupling of the resonator to the piezoelectric ring. An additional advantage of the proposed approach is in a substantial reduction in energy consumption, since conventional quartz resonators use an electrostatic field, which requires on the order of 600 volts to initiate the vibration, and approximately 60 volts to sustain it. In the proposed approach, where a stemless hemispherical resonator is used, the piezoelectric effect is used to initiate the vibration, and the maintenance of the vibration requires not more than one volt.

FIG. 4 illustrates the dependency of the vibration amplitude on the voltage applied to the piezoelectric ring 204. As may be seen from FIG. 4, one volt is sufficient to maintain a stable pattern of vibration in the piezoelectric ring 204.

Figure 5:
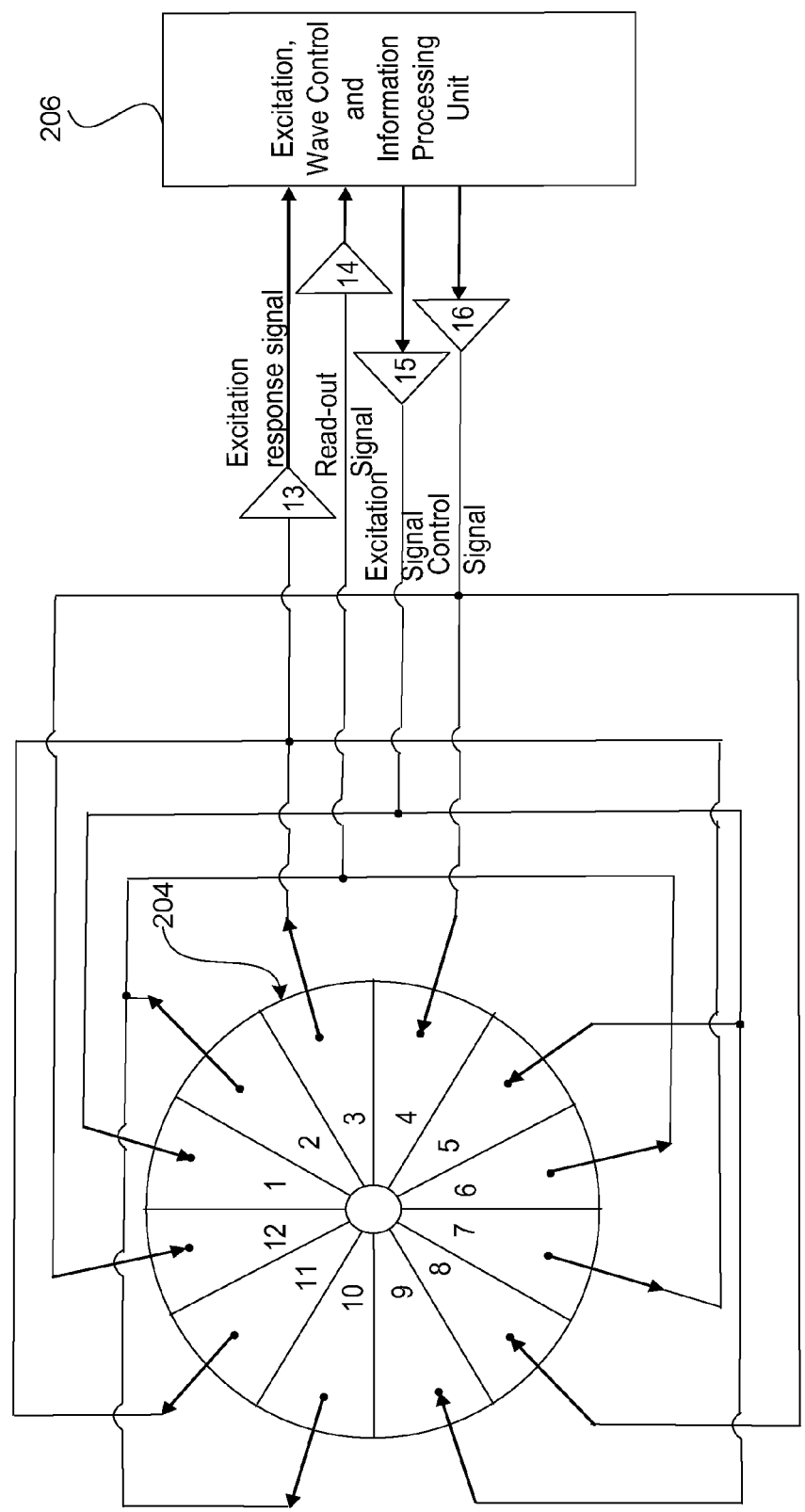
FIG. 5 illustrates how the excitation waveform is driven for the segmented piezoelectric ring, and the angular velocity signal readout.

FIG. 5 illustrates a schematic used for excitation and control of the vibration, as well as for signal readout from a segmented piezoelectric ring. As shown in FIG. 5, the signals are arranged in to groups of three, arranged at 120 degrees. The signals supplied to the sectors 1-5-9 excite the third vibration mode. The signal picked up from sectors 3-7-11 represent the response to excitation, and are used to maintain the vibration by using positive feedback. The signals supplied to sectors 4-8-12 represent the correction signals, which suppress in phase components in the nodes of the standing wave, which occur due to imperfections in the resonator manufacture. The same sectors 4-8-12 receive a negative feedback signal, when the gyroscope works in a force rebalance mode. The signals received from sectors 2-6-10 represent the useful information, and correspond to the angular velocity. These signals can be demodulated and averaged for a high signal-to-noise ratio.

Figure 6:
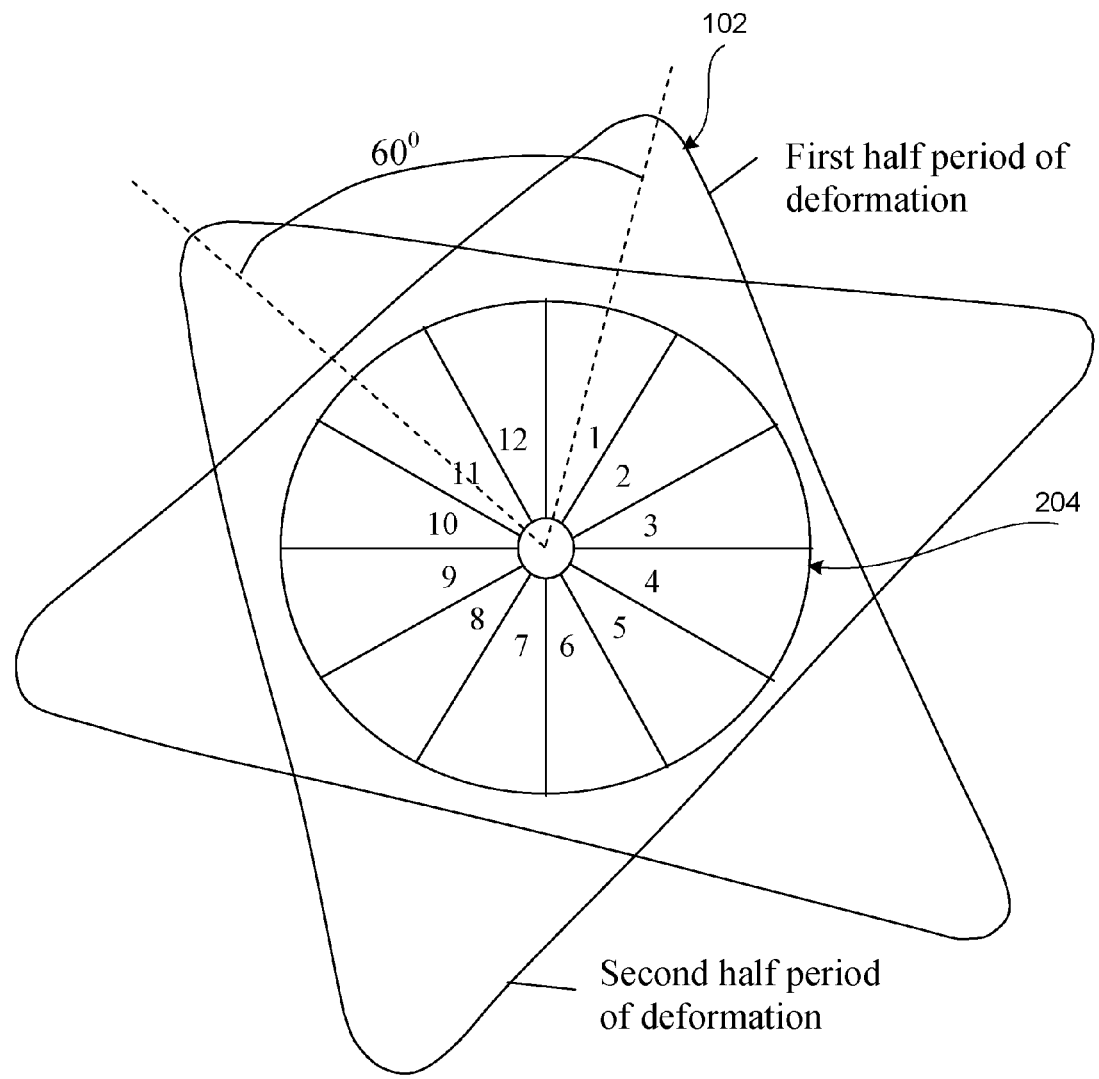
FIG. 6 illustrates the nature of the vibration of the segmented ring when a periodic voltage is applied to it.

FIG. 6 illustrates the nature of the deformation when a segmented ring is used. In this case, there is no need to use capacitive electrodes. This improves noise immunity to external electrostatic and electromagnetic fields, and also reduces the requirements for shielding from external electromagnetic fields, and for high tolerances during the manufacture of the housing of the gyroscope (the housing is not shown in the figures). Typically, the housing can have a conductive film deposited on it. Note also that the distance between the housing and the surface of the hemisphere should preferably be the same, as a function of angular coordinate.

Figure 7:
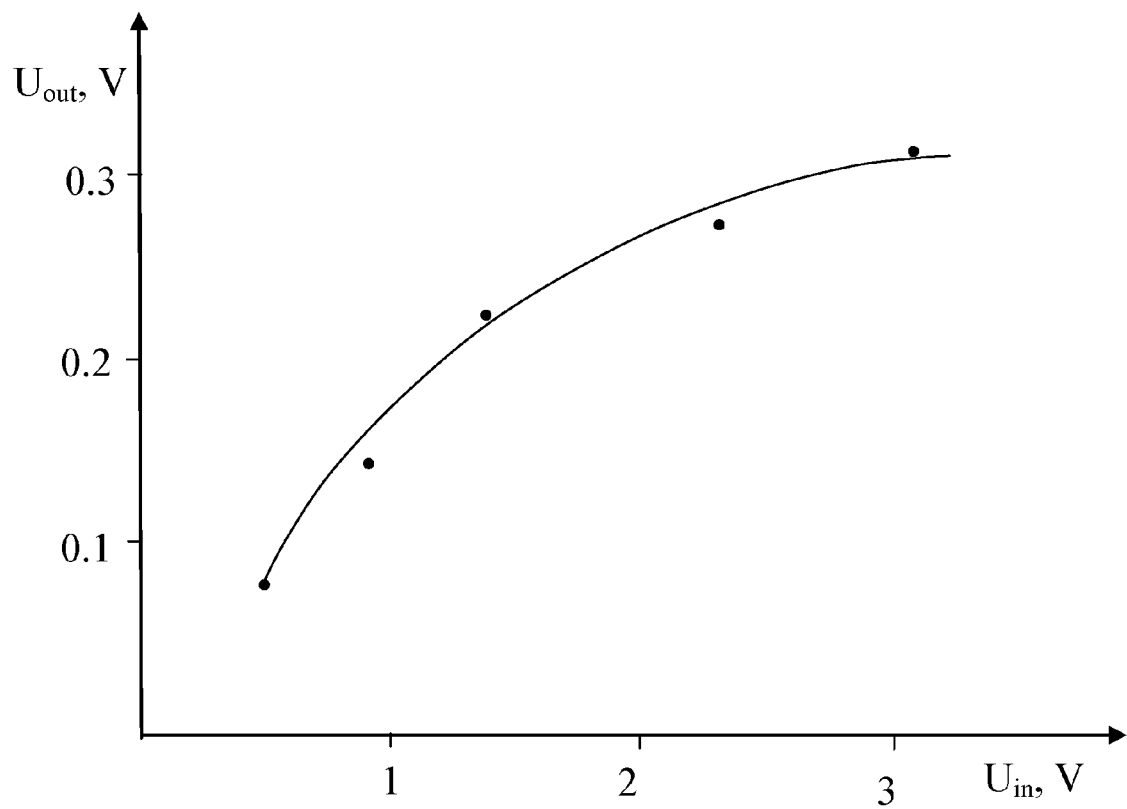
FIG. 7 illustrates the dependency of the vibration at the hemisphere equator on the amplitude of the voltage applied to the segmented ring.

FIG. 7 illustrates the dependency of the amplitude of the vibration of the hemispherical resonator at its equator (measured using a capacitive electrode) on the voltage applied to the corresponding segment of the piezoelectric ring, which is located underneath that electrode. The monotonic (generally parabolic) dependency illustrated in FIG. 7 illustrates how the amplitude of the vibration can be controlled using the applied voltage.

Figure 8:
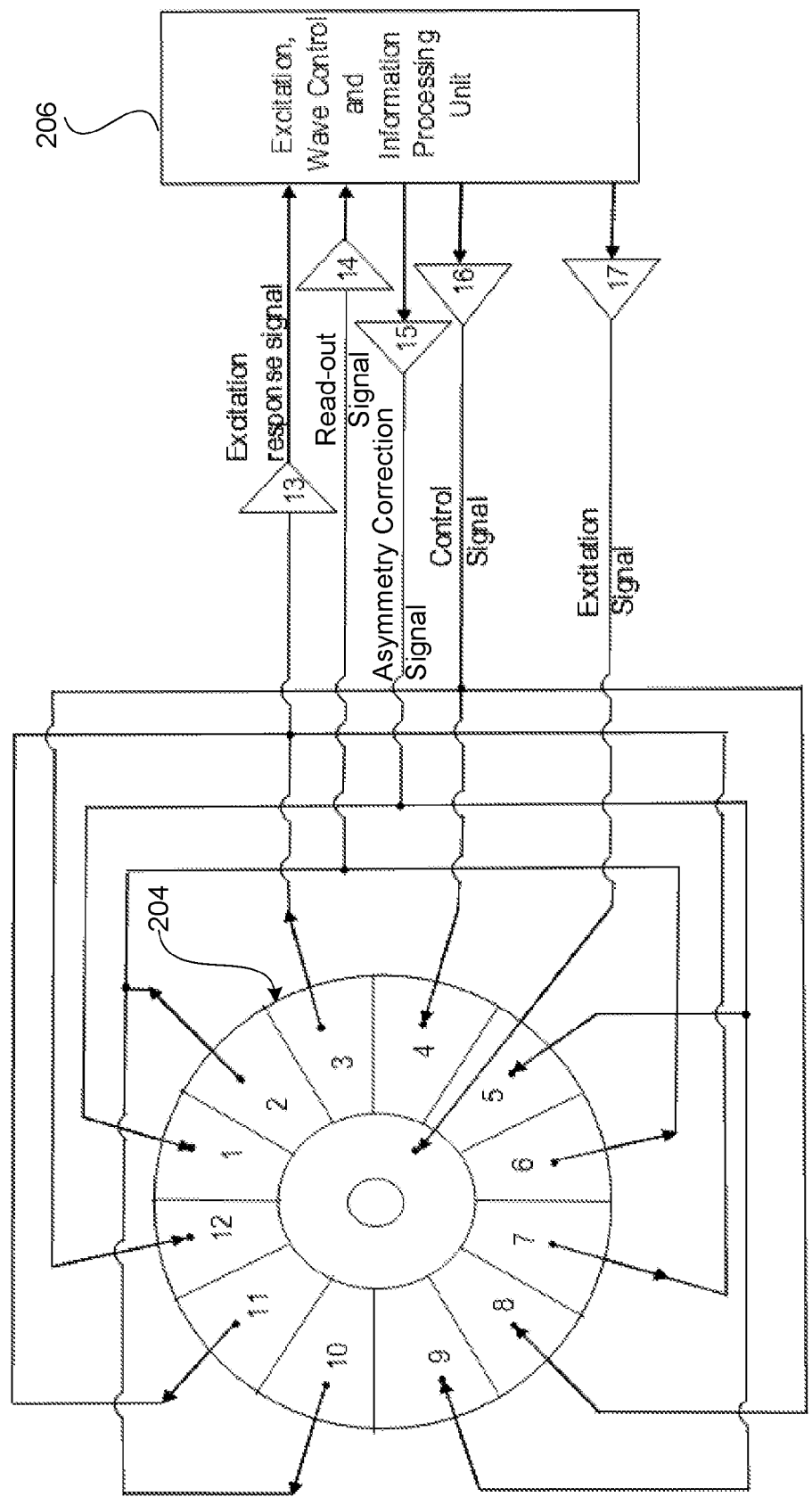
FIG. 8 illustrates a diagram for controlling the excitation voltage and the angular velocity signal readout for using a combined segmented-non-segmented piezoelectric ring.

FIG. 8 illustrates a schematic for excitation and controlling a combined segmented/non-segmented piezoelectric ring. One portion of the piezoelectric ring, the inner portion, is not segmented, while the outer portion of the piezoelectric ring is segmented. In this case, the non-segmented inner portion of the ring is used only to excite the resonator as shown in FIG. 3, and excites the resonator using the forces illustrated in FIG. 2. To control the standing wave and to correct the standing wave, the segments are used, as also illustrated in FIG. 5. Signal readout from the piezoelectric ring can be done using the corresponding segment of the ring, as well as using the additional capacitive electrodes shown in FIG. 2. When a non-segmented ring is used for excitation, the third vibration mode is excited because the voltage that is supplied has a frequency that is close to the natural frequency of the third vibration mode, as well as because this mode has a high Q factor (for example, compared to the second vibration mode), and is therefore energetically favorable. At the same time, segments 1, 5 and 9, used in the embodiment of the segmented ring, are now free, and can be used, for example, to correct the asymmetry of the amplitude of the standing wave, which is due to imperfections in the manufacturing of the ring. In the case of the embodiment illustrated in FIG. 8, it is possible to ensure a high sensitivity to angular velocity, which is a characteristic of capacitive sensors, and a high signal-to-noise ratio, due to the processing of two separate signals—a piezoelectric signal, and a capacitive signal. Furthermore, this provides an additional independent measurement channel that can be used to measure the angular velocity, and can also be used to determine failures and glitches in the sensor, for example, by comparing the two signals. This leads to a general increase in the reliability of the gyroscope.

Figure 9:
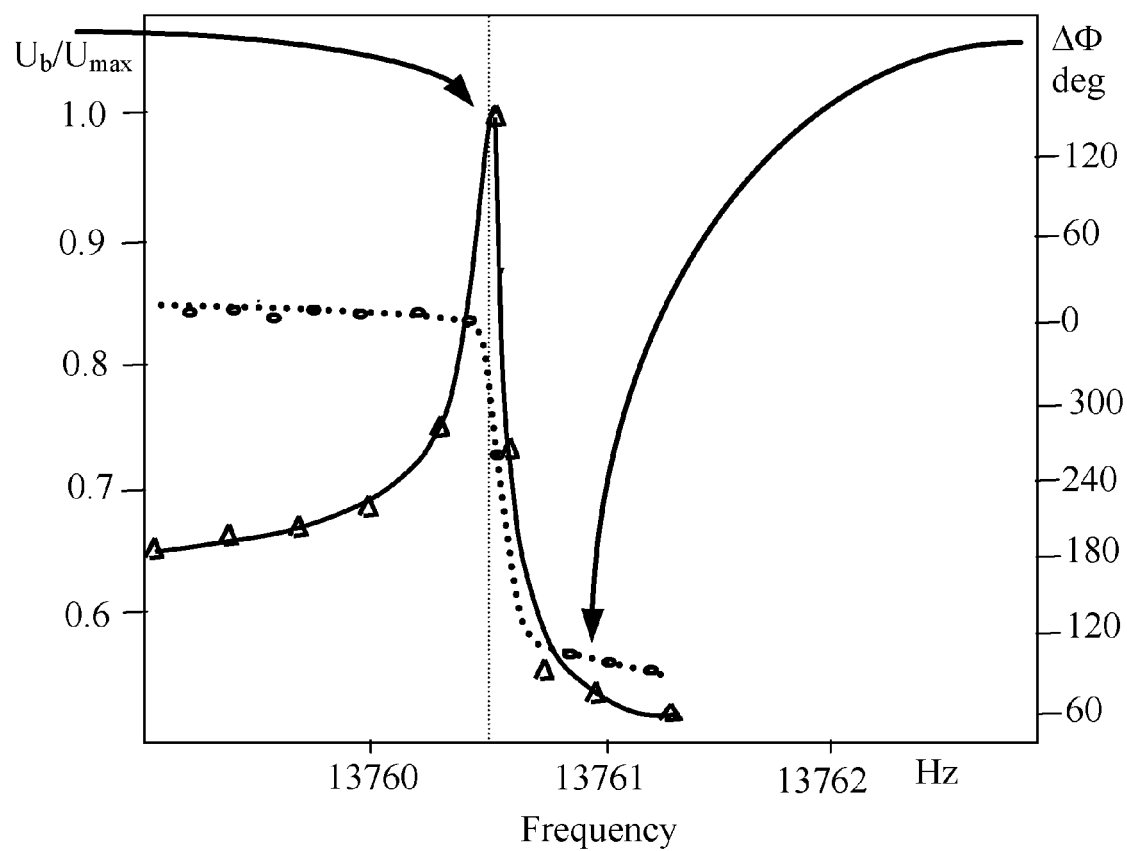
FIG. 9 illustrates the dependency of amplitude and phase on frequency for a hemispherical quartz resonator glued to the piezoelectric ring.

FIG. 9 illustrates the dependency of the amplitude and phase on the frequency of excitation, for the quartz hemispherical resonator that is mounted on a piezoelectric ring using glue attachment. Measurements were normalized by dividing all measured values $U_b$ by the maximum value $U_{max}$, obtained at resonant frequency and represented as a graph $U_b/U_{max}$ versus the excitation frequency. In this example, the piezoelectric ring has a diameter of 20 millimeters, while the diameter of the quartz hemisphere is 30 millimeters. The opening in the ring has the same diameter as the opening in the hemisphere resonator, and both are 4 millimeters. In this example, the Q factor of this resonator is $1.2 \times 10^6$, while the frequency of the third vibration mode is 13760.7 Hz.

Having thus described embodiments of the invention, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A gyroscope comprising:
    a piezoelectric ring having a central opening;
    a hemispherical resonator having a central opening and mounted over the central opening of the piezoelectric ring so that both central openings are aligned, and wherein the two central openings have substantially the same radii;
    a plurality of electrodes delivering a voltage to the piezoelectric ring; and
    a plurality of electrodes mounted on the piezoelectric ring underneath the hemispherical resonator and on a side of the piezoelectric ring facing the hemispherical resonator and providing a signal readout that corresponds to angular velocity.

2. The gyroscope of claim 1, wherein the hemispherical resonator is glued to the piezoelectric ring.

3. The gyroscope of claim 1, wherein the hemispherical resonator vibrates in a third vibration mode.

4. The gyroscope of claim 1, further comprising a plurality of capacitive electrodes at nodes and at antinodes of the vibration of the hemispherical resonator.

5. The gyroscope of claim 4, wherein the capacitive electrodes provide a signal readout that corresponds to the angular velocity.

6. The gyroscope of claim 1, wherein the piezoelectric ring is segmented.

7. The gyroscope of claim 1, wherein the piezoelectric ring is non-segmented.

8. The gyroscope of claim 1, wherein the piezoelectric ring includes an outer segmented portion and an inner non-segmented portion.

9. The gyroscope of claim 8, wherein the inner non-segmented portion is used to excite the resonator into a vibration mode, and the outer segmented portion provides a readout signal and is used to adjust the vibration of the resonator.

10. The gyroscope of claim 1, wherein the piezoelectric ring includes a conductive coating used to conduct excitation voltage to the piezoelectric ring.

11. A gyroscope comprising:
    a sensing element comprising a hemispherical resonator coupled to a piezoelectric ring;
    a plurality of electrodes delivering a voltage to the piezoelectric ring; and
    a plurality of electrodes on the piezoelectric ring underneath the hemispherical resonator and on a side of the piezoelectric ring facing the hemispherical resonator, and providing a signal readout that corresponds to angular velocity,
    wherein a coupling between the hemispherical resonator and the piezoelectric ring is substantially lossless,
    wherein the hemispherical resonator has a central opening at its pole that is positioned over the central opening of the piezoelectric ring and substantially aligned with the central opening of the piezoelectric ring, and
    wherein the two central openings have substantially the same radii.

12. The gyroscope of claim 11, wherein the hemispherical resonator is glued to the piezoelectric ring.

13. The gyroscope of claim 11, wherein the hemispherical resonator vibrates in a third vibration mode.

14. The gyroscope of claim 11, further comprising a plurality of capacitive electrodes at nodes and at antinodes of the vibration of the hemispherical resonator.

15. The gyroscope of claim 11, wherein the piezoelectric ring is segmented.

16. The gyroscope of claim 11, wherein the piezoelectric ring is non-segmented.

17. The gyroscope of claim 11, wherein the piezoelectric ring includes an outer segmented portion and an inner non-segmented portion.

18. The gyroscope of claim 17, wherein the inner non-segmented portion is used to excite the resonator into a vibration mode, and the outer segmented portion provides a readout signal and is used to adjust the vibration of the resonator.

19. A gyroscope comprising:
    a non-segmented piezoelectric ring having a central opening;
    a hemispherical resonator having a central opening and mounted over the central opening of the piezoelectric ring so that both central openings are aligned, and wherein the two central openings have substantially the same radii;
    a first electrode delivering a voltage to the piezoelectric ring; and
    a plurality of capacitive electrodes mounted at nodes and at antinodes of vibration of the hemispherical resonator, and providing a signal readout that corresponds to angular velocity.

* * * * *